United States Patent
Matsubara et al.

(10) Patent No.: US 8,013,935 B2
(45) Date of Patent: Sep. 6, 2011

(54) PICTURE PROCESSING CIRCUIT AND PICTURE PROCESSING METHOD

(75) Inventors: Shogo Matsubara, Musashino (JP); Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1202 days.

(21) Appl. No.: 11/710,502

(22) Filed: Feb. 26, 2007

(65) Prior Publication Data

US 2007/0222890 A1   Sep. 27, 2007

(30) Foreign Application Priority Data

Feb. 28, 2006 (JP) ................. 2006-053414

(51) Int. Cl.
   *H04N 7/01* (2006.01)
(52) U.S. Cl. ........ 348/448; 348/452; 348/451; 348/441; 348/459
(58) Field of Classification Search .............. 348/448, 348/441, 445, 452, 451, 459, 458, 911, 97, 348/700, 699; 382/300, 236; 375/240.01, 375/240.02, 240.16
See application file for complete search history.

(56) References Cited

U.S. PATENT DOCUMENTS

| | | | | |
|---|---|---|---|---|
| 7,388,617 B2 * | 6/2008 | Kasahara et al. | ............ | 348/448 |
| 7,432,979 B2 * | 10/2008 | Tanaka | ............ | 348/448 |
| 7,683,971 B2 * | 3/2010 | Han et al. | ............ | 348/452 |
| 2005/0151878 A1 | 7/2005 | Kasahara et al. | | |

FOREIGN PATENT DOCUMENTS

| | | |
|---|---|---|
| JP | 2002-247529 | 8/2002 |
| JP | 2003-116109 | 4/2003 |
| JP | 2005-249398 | 9/2005 |
| JP | 2007-67653 | 3/2007 |

OTHER PUBLICATIONS

Notice of Reasons for Rejection, mailed Apr. 5, 2011 in JP 2006-053414.

* cited by examiner

*Primary Examiner* — M. Lee
*Assistant Examiner* — Jean W Désir
(74) *Attorney, Agent, or Firm* — Finnegan, Henderson, Farabow, Garrett & Dunner, L.L.P.

(57) ABSTRACT

According to one embodiment, an image processing circuit comprising first memory unit which stores image signal, equalizing circuit which, when there is no movement between two picture signals, outputs average signal between the both signals, second memory unit which stores the average signal, pull-down detecting circuit which outputs pull-down interpolation signal for deinterlacing process from a plurality of frames of the pull-down signals when it is determined that the picture signal is based on the pull-down signals upon receipt of the average signal, an output from the second memory unit, and output from the first memory unit, interpolation signal generating circuit which generates interpolation signal, the outputs from the first and second memory units, and noninterlaced scanning conversion circuit which generates noninterlaced signal by adding the pull-down signals to the output from the second memory unit when the picture signal based on the pull-down signals.

13 Claims, 5 Drawing Sheets

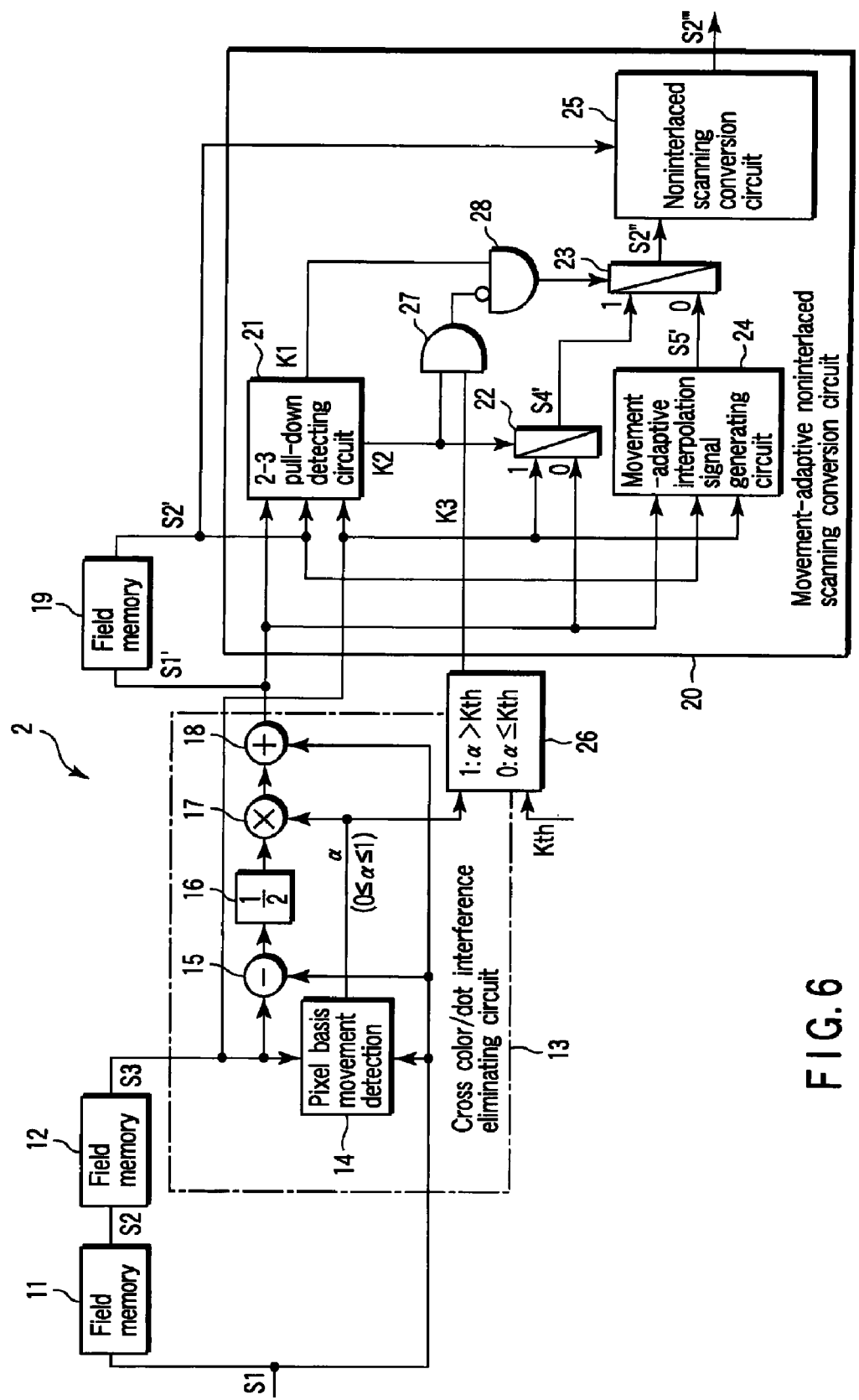
F I G. 6

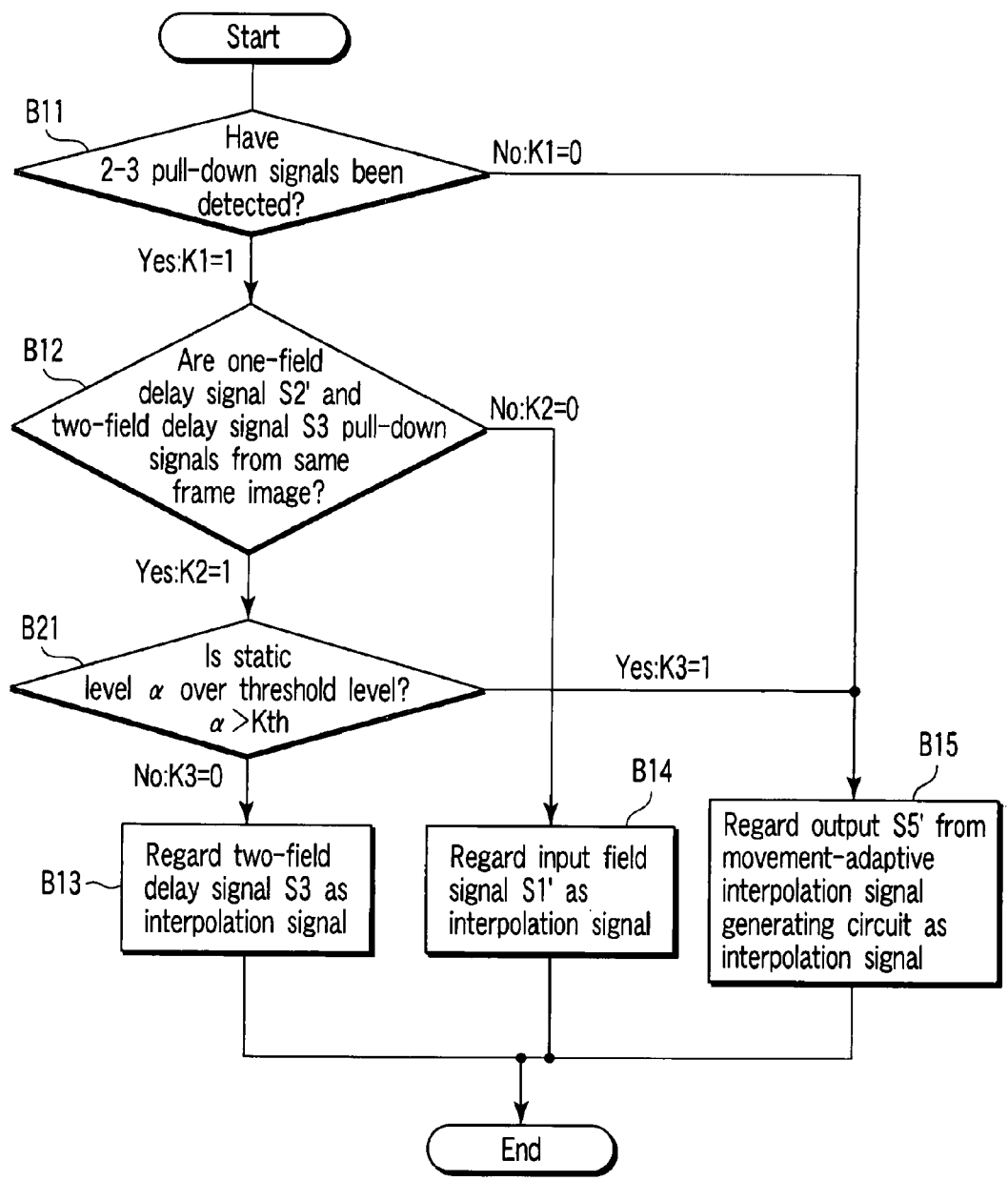
F I G. 7

PICTURE PROCESSING CIRCUIT AND PICTURE PROCESSING METHOD

CROSS-REFERENCE TO RELATED APPLICATIONS

This application is based upon and claims the benefit of priority from Japanese Patent Application No. 2006-053414, filed Feb. 28, 2006, the entire contents of which are incorporated herein by reference.

BACKGROUND

1. Field

One embodiment of the invention relates to a movement-adaptive noninterlaced scanning conversion apparatus and conversion method, and in particular, such an apparatus and method in which a cross color/dot interference eliminating circuit is effectively combined, and an attempt is made to improve image quality and it is possible to curtail memory elements and reduce a driving burden.

2. Description of the Related Art

Generally, when interlaced image signals are converted into noninterlaced image signals in a picture processing circuit, a movement-adaptive noninterlaced scanning conversion circuit is used. Further, at the time of configuring such an image signal processing circuit, measures for a reduction in a circuit scale and a curtailment of the number of memories to be used are usually considered.

In Patent Document 1 (Jpn. Pat. Appln. KOKAI Publication No. 2005-249398), there is disclosed a picture processing circuit in which a memory capacity can be cut down by sharing memories between a cross color/dot interference eliminating circuit and a movement-adaptive noninterlaced scanning conversion circuit.

However, although in the picture processing circuit, a movement-adaptive noninterlaced scanning conversion circuit which generates usual interpolation signals is provided, the following problem arises. That is, a technique has not been disclosed in which, not deinterlacing process is carried out by generating interpolation signals, but noninterlaced signals with high image quality are acquired by selecting and using signals having necessary frames, with respect to pull-down signals obtained in such a manner that picture signals as based on 24 frames per second in movies or the like are converted into 60 frames per second.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 6 is a block diagram of the cross color/dot interference eliminating circuit and the movement-adaptive noninterlaced scanning conversion circuit according to one embodiment of the invention;

FIG. 7 is a flowchart showing one example of a configuration of a picture processing apparatus having an interpolation signal select function according to one embodiment of the invention.

DETAILED DESCRIPTION

Figure 1:
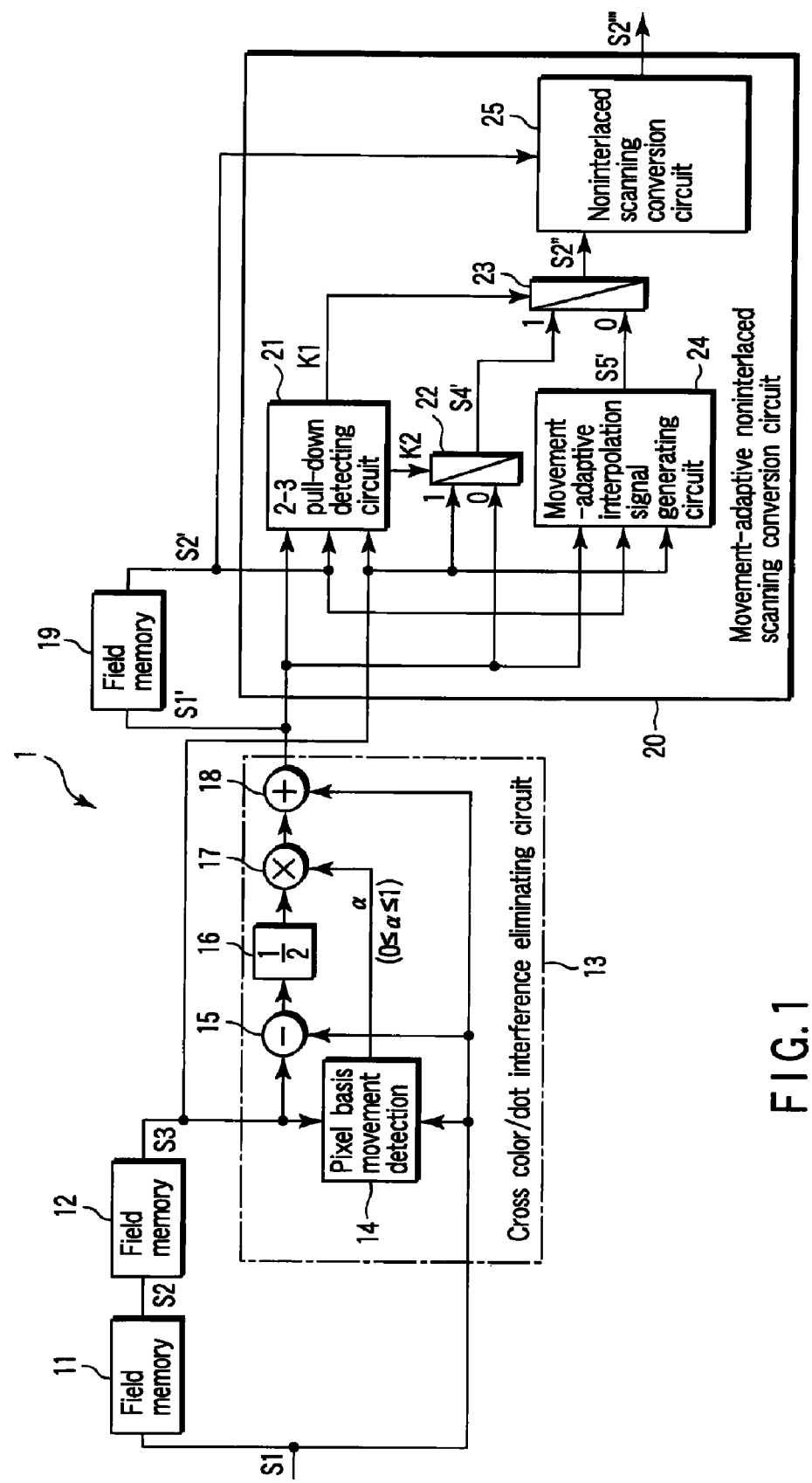
FIG. 1 is a block diagram showing one example of a configuration of a picture processing apparatus including a cross color/dot interference eliminating circuit and a movement-adaptive noninterlaced scanning conversion circuit according to one embodiment of the present invention.

Various embodiments according to the invention will be described hereinafter with reference to the accompanying drawings. In general, according to one embodiment of the invention, there is provided a picture processing apparatus in which cross color/dot interference eliminating process and deinterlacing process by a usual interpolation signal are carried out while cutting down memories, and on the other hand, it is possible to appropriately carry out pull-down processing for frame images.

An embodiment of the present invention provides a picture processing apparatus comprising: a first memory unit (11, 12) which stores a picture signal (S1) in a storage area; an equalizing circuit (13) which detects whether there is a movement or not between the picture signal (S1) and a picture signal (S3) read from the first memory unit, and obtains and outputs an average signal (S1') between the picture signal and the picture signal read from the memory unit at least in a static state; a second memory unit (19) which stores the average signal (S1') from the equalizing circuit in a storage area; a pull-down detecting circuit (21) which determines whether or not the picture signal is based on pull-down signals upon receipt of the average signal (S1') from the equalizing circuit, an output (S2') from the second memory unit, and an output (S3) from the first memory unit, and which selects a pull-down interpolation signal (S4') for deinterlacing process from a plurality of frames of the pull-down signals when it is determined that the picture signal is based on the pull-down signals; an interpolation signal generating circuit (24) which generates an interpolation signal (S5') for deinterlacing process upon receipt of the output (S1') from the equalizing circuit, the output (S2') from the second memory unit, and the output (S3) from the first memory unit; and a noninterlaced scanning conversion circuit (25) which generates a noninterlaced signal (S2''') by adding the pull-down signals to the output from the second memory unit when the pull-down detecting circuit determines that the picture signal is based on the pull-down signals upon receipt of the pull-down interpolation signal (S4') from the pull-down detecting circuit or the interpolation signal (S5') from the interpolation signal generating circuit, and which generates a noninterlaced signal (S2''') by adding the interpolation signal to the output from the second memory unit when the pull-down detecting circuit determines that the picture signal is not based on the pull-down signals.

As a consequence, cross color/dot interference elimination, deinterlacing process by a usual movement-adaptive interpolation signal, and deinterlacing process by detection and pull-down processing of picture signals based on movies or the like are simultaneously achieved while carrying out cut-down in memories.

Hereinafter, the embodiment of the invention will be described in detail with reference to the drawings.

Figure 2:
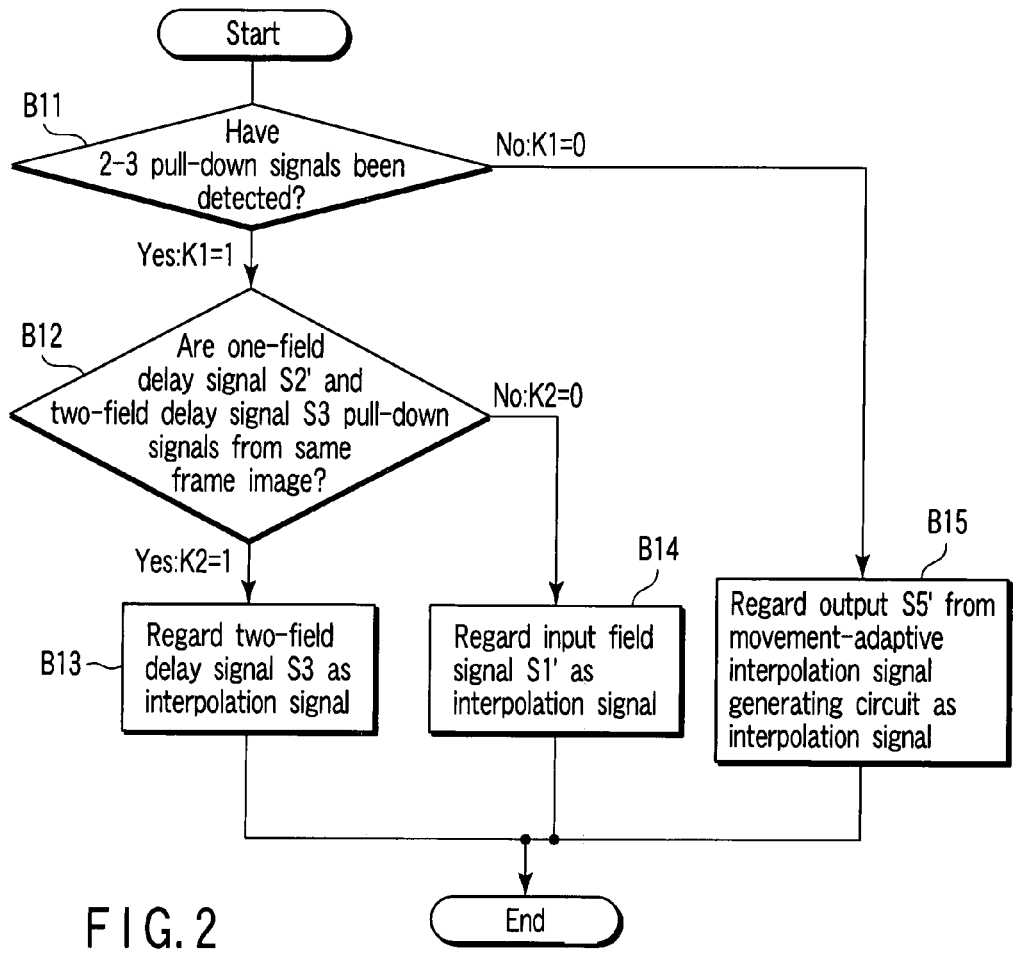
FIG. 2 is a flowchart showing one example of processing for selecting an interpolation signal in the movement-adaptive noninterlaced scanning conversion circuit according to one embodiment of the invention.
Figure 3:
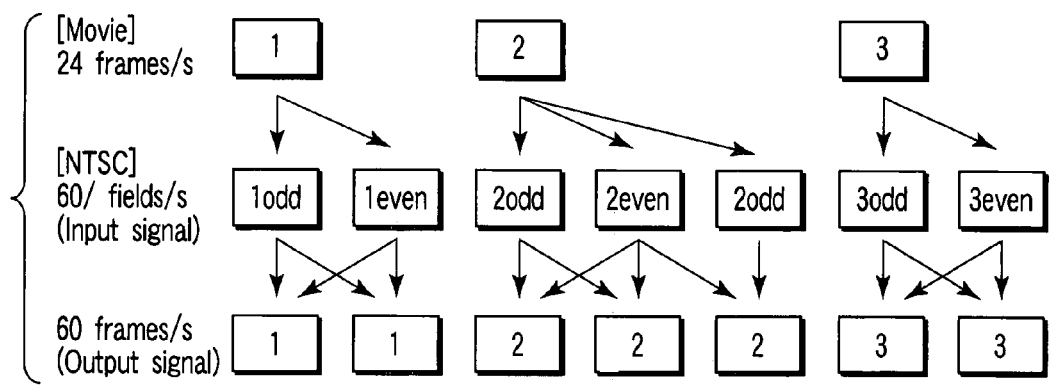
FIG. 3 is an explanatory diagram of processing of a 2-3 pull-down detecting circuit according to one embodiment of the invention.
Figure 4:
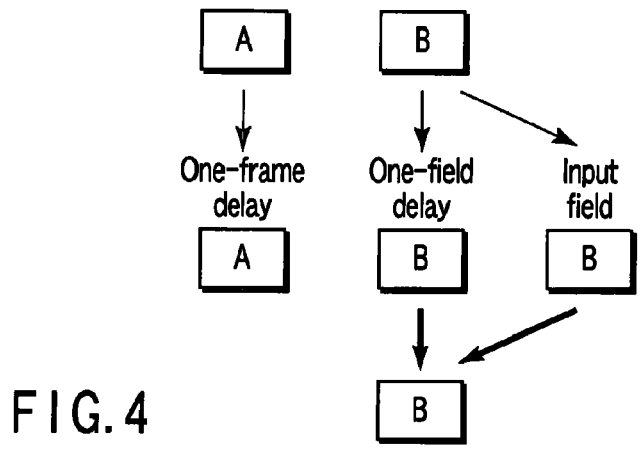
FIG. 4 is an explanatory diagram of 2-3 pull-down processing by utilizing an input field signal and a one-field delay signal according to one embodiment of the invention.
Figure 5:
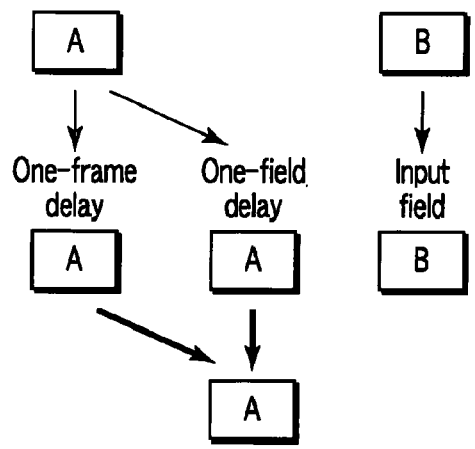
FIG. 5 is an explanatory diagram of 2-3 pull-down processing by utilizing a one-field delay signal and a two-field delay signal according to one embodiment of the invention.
Figure 8:
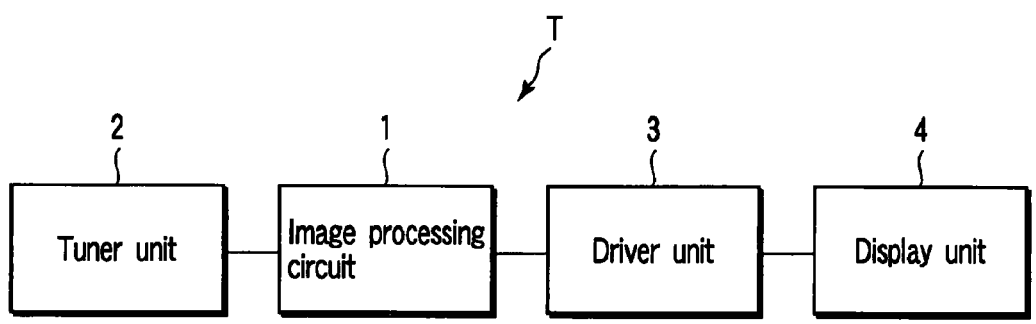
FIG. 8 is a block diagram showing one example of a configuration of a television device including the picture processing apparatus according to one embodiment of the invention.

FIG. 1 is a block diagram showing one example of a configuration of a picture processing apparatus including a cross color/dot interference eliminating circuit and a movement-adaptive noninterlaced scanning conversion circuit according to one embodiment of the invention. FIG. 2 is a flowchart showing one example of processing for selecting an interpolation signal in the movement-adaptive noninterlaced scanning conversion circuit according to one embodiment of the invention. FIG. 3 is an explanatory diagram of processing of a 2-3 pull-down detecting circuit according to one embodiment of the invention. FIG. 4 is an explanatory diagram of 2-3 pull-down processing utilizing an input field signal and a one-field delay signal according to one embodiment of the invention. FIG. 5 is an explanatory diagram of 2-3 pull-down processing utilizing a one-field delay signal and a two-field delay signal according to one embodiment of the invention. FIG. 6 is a block diagram of the cross color/dot interference eliminating circuit and the movement-adaptive noninterlaced scanning conversion circuit according to one embodiment of the invention. FIG. 7 is a flowchart showing one example of a configuration of a picture processing apparatus having an interpolation signal select function according to one embodiment of the invention. FIG. 8 is a block diagram showing one example of a configuration of a television device including the picture processing apparatus according to one embodiment of the invention.

<Picture Processing Apparatus According to First Embodiment: Cross Color/Dot Interference Eliminating Circuit, Movement-Adaptive Noninterlaced Scanning Conversion Circuit>

A picture processing apparatus according to a first embodiment is a picture processing apparatus in which cross color/dot interference elimination, usual deinterlacing process by a movement-adaptive interpolation signal, and deinterlacing process by detection and pull-down processing of picture signals based on movies or the like are simultaneously achieved while carrying out cut-down in memories.

(Configuration)

One example of a configuration of the picture processing apparatus according to one embodiment of the invention will be described with reference to FIG. 1. The picture processing apparatus 1 has a field memory 11 to which a picture signal is supplied from, for example, a tuner unit 2 shown in FIG. 8, a field memory 12 which is connected in series to the field memory 11, a cross color/dot interference eliminating circuit 13 to which an output of the field memory 12 is connected, and another field memory 19 to which an output of the cross color/dot interference eliminating circuit 13 is connected. Here, storage capacities of the field memory 11 and the field memory 12 which is connected in series to the field memory 11 are, as one example, made substantially double a storage capacity of the another field memory 19 to which an output thereof is connected.

Moreover, the picture processing apparatus 1 has a movement-adaptive noninterlaced scanning conversion circuit 20 to which an output from the cross color/dot interference eliminating circuit 13, an output S3 from the field memory 12, and an output S2' of the field memory 19 are supplied.

Here, the cross color/dot interference eliminating circuit 13 has a pixel basis movement detector 14 which receives a picture signal S1 provided from the exterior, and a read signal S1 from the field memory 12, a subtracter 15 which receives the read signal S1 from the field memory 12 and a signal S3 from the field memory 12, a computing unit 16 which receives an output from the subtracter 15, a multiplier 17 which multiples the output from the computing unit 16 by the output from the pixel basis movement detector 14, and an adder 18 which receives an output from the multiplier 17. Note that the respective sections of the cross color/dot interference eliminating circuit 13 are configured in such a manner that the calculation of the arithmetic expression:

$$S1' = S1 + \alpha\{(S3-S2)/2\} \quad (1)$$

has been achieved on the circuit.

Further, the movement-adaptive noninterlaced scanning conversion circuit 20 receives an output S1' from the cross color/dot interference eliminating circuit 13, an output S2' from the field memory 19, and an output S3 from the field memory 12 to thereby output a noninterlaced signal S2'''. The movement-adaptive noninterlaced scanning conversion circuit 20 has a 2-3 pull-down detecting circuit 21, a movement-adaptive interpolation signal generating circuit 24, a logical operator 23, a logical operator 22, and a noninterlaced scanning conversion circuit 25. The 2-3 pull-down detecting circuit 21 receives the three signals S1', S2' and S3, and the movement-adaptive interpolation signal generating circuit 24 also receives the three signals S1', S2' and S3. The logical operator 23 receives a detection flag K1 from the 2-3 pull-down detecting circuit 21, and the logical operator 22 receives a detection flag K2 in the same way. The logical operator 23 receives the detection flag K1 from the 2-3 pull-down detecting circuit 21 and an output S4' from the logical operator 22. The noninterlaced scanning conversion circuit 25 receives a signal S2' for filling in scanning lines from the logical operator 23, and receives an original picture signal from the field memory 19.

(Functions and Operations)

Next, functions and operations of the sections will be described in detail with reference to the drawings.

Cross Color/dot Interference Eliminating Circuit

First, a function of the cross color/dot interference eliminating circuit 13 is to make an attempt to eliminate the problem that frequency characteristics of Y component and C component of a picture signal are partially in common, which results in incomplete separation, and this is brought about as a defect in outline such as a rainbow on a screen.

In other words, a noise component in Y component and a noise component in C component with different phases in a picture signal can be eliminated by taking an average value of the both of the picture signal. When there is a movement in an image, however, there is the problem that an outline or the like of the image is blurred by carrying out the equalization processing. Accordingly, it is determined whether or not a current picture signal is a still image or a moving image by using the pixel basis movement detector 14, and a result thereof is reflected in the following process.

In this case, the field memories 11, 12, and 19 are shared and stored between the cross color/dot interference eliminating circuit 13 and the movement-adaptive noninterlaced scanning conversion circuit 20. As a result, it is possible to cut down memory elements.

Hereinafter, operations of the image processing apparatus 1 will be described. First, picture signals supplied from the tuner unit 2 or the like of FIG. 8 are sequentially stored in the two-stage field memory as an input field signal S1, and respectively stored as a one-filed delay signal S2 and a two-field delay signal S3. Then, a static level a (an extent of movement) is output by the inter-frame pixel basis movement detecting circuit 14 by use of the input field signal S1 of an interlaced image input to the cross color/dot interference eliminating circuit 13 and the two-field delay signal S3. The static level α is a numeric value in which, with "1" being a static state, the less the value is, the greater the movement is. An operation of the cross color/dot interference eliminating circuit on the basis of the static level α is determined on the basis of the following formula (1).

$$S1'=S1+\alpha\{(S3-S2)/2\} \quad (1)$$

Assume that α=1 in the case of a still image, and an average is taken between one frames of the S1 and S3, which is given as S1'. In this case, a value of α is changed in stages from 0 to 1 in accordance with an extent of movement, and the greater the movement is, the higher the ratio of the input signal is output.

Here, arithmetic processing expressed by the formula (1) is achieved by the configuration of the subtracter 15, the computing unit 16, the multiplier 17, and the adder 18.

As a consequence, when the static level a of the picture signal is great or "1", it is possible to eliminate cross color and dot interference by founding an average signal S1' between the picture signal S1 and the picture signal S3 read from the memories 11 and 12. In addition, when there is a great movement in the picture signal, equalization processing is suppressed, which does not bring about a defect such that an outline of a picture is blurred or the like in any case.

Movement-adaptive Noninterlaced Scanning Conversion Processing

Moreover, description will be given to a function of the movement-adaptive noninterlaced scanning conversion circuit 20 which receives the signal S1' supplied from the cross color/dot interference eliminating circuit 13 with reference to the flowchart of FIG. 2 and the like.

The input field signals S1' with cross color/dot interference eliminated therefrom are sequentially stored in the field memories, retained as a one-field delay signal S2' with cross color/dot interference eliminated therefrom, and handled as direct signals of the noninterlaced scanning conversion circuit 25. Then, in order to curtail the field memories 11 and 12 of two fields which are necessary for using signals of three fields at the movement-adaptive interpolation signal generating circuit 24 and the 2-3 pull-down detecting circuit, to those of one field, and moreover, in order to reduce an access amount to the field memories, a two-field delay signal S3 from which cross color/dot interference has not been eliminated is used. The three signals, i.e., the input field signal S1' with cross color/dot interference eliminated therefrom, the one-field delay signal S2' with cross color/dot interference eliminated therefrom, and the two-field delay signal S3 used in the cross color/dot interference eliminating circuit are input into the movement-adaptive interpolation signal generating circuit 24 and the 2-3 pull-down detecting circuit 21.

As an interpolation signal, the 2-3 pull-down detecting circuit 21 generates an interpolation signal S4' on the basis of the input three signals, and the movement-adaptive interpolation signal generating circuit 24 generates an interpolation signal S5' on the basis of the same input three signals. A method for selecting an interpolation signal follows the flowchart shown in FIG. 2 to detect 2-3 pull-down signals (block B11). Then, when 2-3 pull-down signals are detected, the flag K1 is regarded as "1", and an interpolation signal S4' which is selected by the flag K2 in accordance with a pattern of processing which will be described later on the basis of the input field signal S1' with cross color/dot interference eliminated therefrom, and the two-field delay signal S3, is selected as a final interpolation signal S2".

More specifically, it is determined whether or not the one-field delay signal S2' and the two-field delay signal S3 are pull-down signals from a same frame image (block B12). When the both are pull-down signals from a same frame image, the two-field delay signal S3 is an interpolation signal given that the flag K2=1 (block B13), and the processing shown in FIG. 5 is carried out. When the both are not the same, the flag K2=0, and the input field signal S1' is an interpolation signal (block B14). Namely, the processing shown in FIG. 4 is carried out.

When 2-3 pull-down signals are not detected in block B11, the flag K1 is regarded as "0", and the interpolation signal S5' prepared at the movement-adaptive interpolation signal generating circuit 24 is selected as a final interpolation signal S2". The interpolation signal obtained by the selection and the previously-mentioned direct signal S2' are synthesized at the noninterlaced scanning conversion circuit 25, and the signal is output as the noninterlaced scanning conversion signal S2" (block B15).

Here, FIG. 3 shows the configuration of the 2-3 pull-down detecting circuit 23. In FIG. 3, when the picture signal is originally a pull-down signal consisting of 24 frames or the like per second, a picture signal consisting of 60 frames has regularity such as "1, 1, 2, 2, 2, 3, 3" to a great extent. Detecting the regularity makes it possible to detect that the picture signal is based on pull-down signals.

As a result, it is possible to improve the image quality in the case where necessary frames are extracted from the picture signal and the extracted frames are utilized for deinterlacing process more than the case where an interpolation signal is generated by calculation at the movement-adaptive interpolation signal generating circuit 24 at the time of deinterlacing process at the subsequent stage.

Accordingly, an input signal of 24 frames per second can be reproduced faithfully by selecting a one-field delay signal which is a direct signal, an input field signal or a two-field delay signal as an interpolation signal to be synthesized in accordance with a pattern of the 2-3 pull-down signals as shown.

FIG. 4 shows 2-3 pull-down processing utilizing an input field signal and a one-field delay signal. An operation corresponding to the block diagram of FIG. 1 is a method in which the flag K2 is regarded as "0", and the input filed signal S1' is selected as the interpolation signal S2" and is synthesized with the direct signal S2' to be S2".

Next, FIG. 5 shows 2-3 pull-down processing utilizing a one-field delay signal and a two-field delay signal. Similarly, an operation corresponding to the block diagram of FIG. 1 is a method in which the flag K2 is regarded as "1", and the two-field delay signal S3 used in the cross color/dot interference eliminating circuit is selected as the interpolation signal S2" and is synthesized with the direct signal S2' to be S2".

By such methods, in the picture processing apparatus shown in the first embodiment, it is possible to carry out detection of pull-down signals as well while the field memories 11, 12 and 19 are shared between the cross color/dot interference eliminating circuit 13 and the movement-adaptive noninterlaced scanning conversion circuit.

<Picture Processing Apparatus According to Second Embodiment>

A picture processing apparatus according to a second embodiment is to solve the following defect in the picture processing apparatus according to the first embodiment. When the conditions of:
1) Pull-down signals are detected (K1=1);
2) S2' and S3 are the same (K2=1); and
3) Static level α>Kth (K3=1)

are satisfied, cross color/dot interference is mixed into a noninterlaced signal, and when the above-described conditions are satisfied, deinterlacing process is carried out with the output S5' from the movement-adaptive interpolation signal generating circuit being as an interpolation signal.

(Defect Point to be Solved)

In the picture processing apparatus shown in the first embodiment, there is the following defect. The defect is brought about when the one-field delay signal S2 shown in FIG. 5 and the two-field delay signal S3 used in the cross color/dot interference eliminating circuit 13 are synthesized. More specifically, there is the defect that, because the one-field delay signal S2' with cross color/dot interference eliminated therefrom and the two-field delay signal S3 from which cross color/dot interference has not been eliminated are synthesized, cross color/dot interference is mixed in the signal at the time of carrying out 2-3 pull-down processing.

(Configuration)

As shown in FIG. 6, the picture processing apparatus 1 according to the second embodiment has a configuration basically in common with the picture processing apparatus 1 of FIG. 1. Description thereof will be omitted, and only a different point will be described hereinafter. Namely, in order to solve the above-described defect, the picture processing apparatus 1 according to the second embodiment is configured such that deinterlacing process is carried out by using the output S5' from the movement-adaptive interpolation signal generating circuit as an interpolation signal when the conditions of 1) Pull-down signals are detected (K1=1), 2) S2' and S3 are the same (K2=1), and 3) Static level α>Kth (K3=1) are satisfied.

Therefore, the picture processing apparatus 1 further includes, by way of example, a comparator 26, an AND circuit 27, and a NAND circuit 28. The comparator 26 is connected to an output of the pixel basis movement detection unit 14. The AND circuit 27 receives the output K3 at an input terminal at one end thereof, and receives the output K2 from the 2-3 pull-down detecting circuit 21 at an input terminal at the other end. The NAND circuit 28 receives an output from the AND circuit 27 at an inverting input terminal thereof, and receives an output from the 2-3 pull-down detecting circuit 21 at an input terminal at the other end. The picture processing apparatus 1 also has a configuration in which an output from the NAND circuit 28 is supplied to the logical operator 23.

(Functions and Operations)

While the picture processing apparatus 1 according to the second embodiment carries out substantially the same operations in the flowchart of FIG. 2 in accordance with the flowchart shown in FIG. 7 by such a configuration, a different point will be described in detail. Namely, the 2-3 pull-down detecting circuit 21 detects 2-3 pull-down signals (block B11). When the one-field delay signal S2' and the two-field delay signal S3 are pull-down signals from a same frame image (block B12), and moreover, the static level α is greater than a threshold level Kth (in a static state), deinterlacing process is carried out by using the output S5' from the movement-adaptive interpolation signal generating circuit 24 as an interpolation signal (block B15).

Consequently, when it is determined that the picture signal is based on pull-down signals (24 frames or the like) by detecting pull-down, an output (S3) from a first memory unit and an output (S2') from a second memory unit are pull-down signals from a same frame image, and moreover, an extent of static between the picture signal (S1) and the picture signal (S3) read from the first memory unit is greater than a given value (α>Kth), deinterlacing with pull-down is stopped, and it is possible to avoid strain such as a rainbow on a screen by carrying out processing with a usual interpolation signal.

According to the various embodiments described above, those skilled in the art can realize the present invention. It is easy for those skilled in the art to further conceive of various modified examples of these embodiments, and the present invention can be applied to various embodiments without inventive ability. Accordingly, the present invention extends over a broad range which does not contradict the disclosed principles and the novel features, and is not limited to the above-described embodiments.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A picture processing apparatus comprising:
   a first memory unit which stores a picture signal in a storage area;
   an equalizing circuit which detects whether there is a movement or not between the picture signal and a picture signal read from the first memory unit, and obtains and outputs an average signal between the picture signal and the picture signal read from the memory unit at least in a static state;
   a second memory unit which stores the average signal from the equalizing circuit in a storage area;
   a pull-down detecting circuit which determines whether or not the picture signal is based on pull-down signals upon receipt of the average signal from the equalizing circuit, an output from the second memory unit, and an output from the first memory unit, and which selects a pull-down interpolation signal for deinterlacing process from a plurality of frames of the pull-down signals when it is determined that the picture signal is based on the pull-down signals;
   an interpolation signal generating circuit which generates an interpolation signal for deinterlacing process upon receipt of the output from the equalizing circuit, the output from the second memory unit, and the output from the first memory unit; and
   a noninterlaced scanning conversion circuit which generates a noninterlaced signal by adding the pull-down signals to the output from the second memory unit when the pull-down detecting circuit determines that the picture signal is based on the pull-down signals upon receipt of the pull-down interpolation signal from the pull-down detecting circuit or the interpolation signal from the interpolation signal generating circuit, and which generates a noninterlaced signal by adding the interpolation signal to the output from the second memory unit when the pull-down detecting circuit determines that the picture signal is not based on the pull-down signals.

2. The picture processing apparatus according to claim 1, wherein elimination of cross color/dot interference in the image signal is carried out by the equalizing circuit.

3. The picture processing apparatus according to claim 1, wherein the equalizing circuit carries out equalization to a greater extent when a static level is made greater, and carries out equalization to a less extent when a static level is made less, and a movement of a picture is made greater, in accordance with an extent of a static state of the picture signal.

4. The picture processing apparatus according to claim 1, wherein a capacity of the first memory is substantially double that of the second memory.

5. The picture processing apparatus according to claim 1, wherein the pull-down detecting circuit determines whether or not the picture signal is based on the pull-down signals in accordance with whether or not a same frame image continues regularly in the picture signal.

6. The picture processing apparatus according to claim 1, wherein, when the pull-down detecting circuit determines that the picture signal is based on the pull-down signals and the pull-down detecting circuit determines that the output from the first memory unit and the output from the second memory unit are the same, and that a static level between the picture signal and the picture signal read from the first memory unit is greater than or equal to a given value, the noninterlaced scanning conversion circuit generates a noninterlaced signal by adding the interpolation signal from the interpolation signal generating circuit to the output from the second memory unit.

7. The picture processing apparatus according to claim 1, further comprising:
   a tuner unit which supplies the picture signal to the first memory unit;
   a driver unit which generates a driving signal upon receipt of the noninterlaced signal from the noninterlaced scanning conversion circuit; and
   a display unit which receives the noninterlaced signal, and displays an image in accordance with the noninterlaced signal.

8. A picture processing method comprising:
   storing a picture signal in a first storage area;
   detecting whether there is a movement or not between the picture signal and a picture signal read from the first storage area, and obtaining and outputting an average signal between the picture signal and the picture signal read from the first storage area at least in a static state;
   storing the average signal in a second storage area;
   determining whether or not the picture signal is based on pull-down signals upon receipt of the average signal, an output from the second storage area, and an output from the first storage area, and extracting a pull-down interpolation signal for deinterlacing process from a plurality of frames of the pull-down signals when it is determined that the picture signal is based on the pull-down signals;
   generating an interpolation signal for deinterlacing process upon receipt of the output by the equalization, the output from the second storage area, and the output from the first storage area; and
   generating a noninterlaced signal by adding the pull-down signals to the output from the second memory unit when it is determined that the picture signal is based on the pull-down signals upon receipt of the pull-down interpolation signal or the interpolation signal, and generating a noninterlaced signal by adding the interpolation signal to the output from the second storage area when it is determined that the picture signal is not based on the pull-down signals.

9. The image processing method according to claim 8, wherein cross color/dot interference in the image signal is eliminated.

10. The image processing method according to claim 8, wherein, in accordance with an extent of a static state of the picture signal, equalization is carried out to a greater extent when a static level is made greater, and equalization is carried out to a less extent when a static level is made less and a movement of an image is made greater.

11. The image processing method according to claim 8, wherein a capacity of the first storage area is substantially double that of the second storage area.

12. The image processing method according to claim 8, wherein it is determined whether or not the picture signal is based on the pull-down signals in accordance with whether a same frame image continues regularly or not in the picture signal.

13. The image processing method according to claim 8, wherein, when it is determined that the picture signal is based on the pull-down signals, and it is determined that the output from the first storage area and the output from the second storage area are the same, and that a static level between the picture signal and the picture signal read from the first storage area is greater than or equal to a given value, a noninterlaced signal is generated by adding the interpolation signal to the output from the second storage area.

* * * * *

UNITED STATES PATENT AND TRADEMARK OFFICE
CERTIFICATE OF CORRECTION

| | | |
|---|---|---|
| PATENT NO. | : 8,013,935 B2 | Page 1 of 1 |
| APPLICATION NO. | : 11/710502 | |
| DATED | : September 6, 2011 | |
| INVENTOR(S) | : Matsubara et al. | |

It is certified that error appears in the above-identified patent and that said Letters Patent is hereby corrected as shown below:

Title page, item (57), in the Abstract, line 11, change "and output" to --an output--.

Title page, item (57), in the Abstract, line 16, change "signal based" to --signal is based--.

Signed and Sealed this

Thirty-first Day of January, 2012

David J. Kappos
*Director of the United States Patent and Trademark Office*